United States Patent [19]

Morency et al.

[11] Patent Number: 5,115,483
[45] Date of Patent: May 19, 1992

[54] HIGH-STRENGTH IN-LINE FIBER OPTIC CONNECTOR

[75] Inventors: Roger L. Morency, Voluntown; Gregory H. Ames, Gales Ferry, both of Conn.

[73] Assignee: The United States of America as represented by the Secretary of the Navy, Washington, D.C.

[21] Appl. No.: 691,767

[22] Filed: Apr. 26, 1991

[51] Int. Cl.$^5$ .............................................. G02B 6/38
[52] U.S. Cl. ........................................ 385/60; 385/55; 385/56
[58] Field of Search ............... 350/96.20, 96.21, 96.22; 385/53–60, 66, 72

[56] References Cited

U.S. PATENT DOCUMENTS

| | | | |
|---|---|---|---|
| 4,815,808 | 3/1989 | Honma et al. | 350/96.21 X |
| 4,834,494 | 5/1989 | DeMeritt et al. | 350/96.21 |
| 4,878,730 | 11/1989 | Wall | 350/96.21 |
| 4,913,512 | 4/1990 | Anderton | 350/96.21 X |

Primary Examiner—John D. Lee
Assistant Examiner—Phan T. Heartney
Attorney, Agent, or Firm—Michael J. McGowan; Prithvi C. Lall; Michael F. Oglo

[57] ABSTRACT

An in-line fiber optic connector has a pair of ferruled components having ferrules enclosing optical fibers. The optical fibers are connected by placing the faces of said ferrules in abutment with each other inside a split tube. Threaded components that abut the ferruled components bring the faces of the ferrules together by being threaded to each other. This enables the compression between the faces of the ferrules to be closely controlled.

8 Claims, 2 Drawing Sheets

HIGH-STRENGTH IN-LINE FIBER OPTIC CONNECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to the coupling of optical fibers. More particularly the invention is a high-strength miniature fiber optic connector for single or multi-mode fiber. The coupled optical fibers remain operationally stable under varying loads and stresses.

(2) Description of the Prior Art

Previously fabricated fiber optic couplings, connectors, and splices are predominantly of low strength and non-stable under load. Some known prior art interfaces for the coupling of optical fibers are formed by physically pushing the opposing faces against each other within a tube. The tube functions to provide both alignment of the optical fibers and holding strength to prevent their decoupling.

SUMMARY OF THE INVENTION

Accordingly, it is a general purpose and object of the present invention to provide an improved coupling for connecting optical fibers. Specific objects are that the coupling is dematable and of high strength. An additional object is that the coupling is suitable for having a measured force provide the means for compressing the opposing faces containing the fiber optic components.

These objects are accomplished with the present invention by providing a coupling system that uses components that can have their faces compressed against each other by using a measured torque. A fiber optic interface is formed by moving components containing optical fibers in an axial direction by torquing adjacent components. A separate alignment component is used to provide precise alignment of opposing faces containing the optical fibers. The coupled fiber optic components are easily dematable by uncoupling the torqued components and pulling the opposing faces apart from the separate alignment component.

DESCRIPTION OF THE PREFERRED EMBODIMENTS

Figure 1:
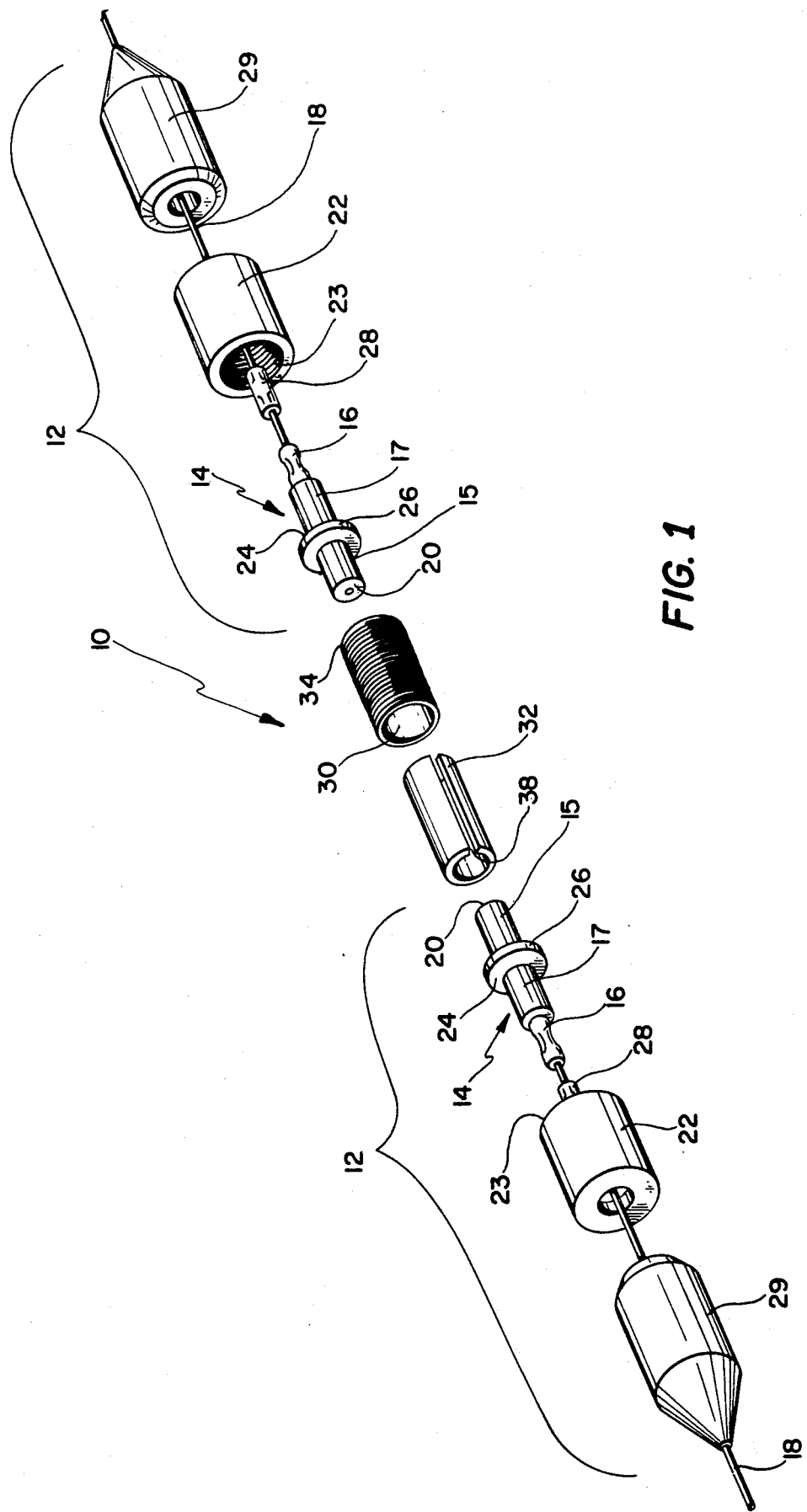
FIG. 1 is an exploded view of a fiber optic coupling in accordance with the present invention.
Figure 2:
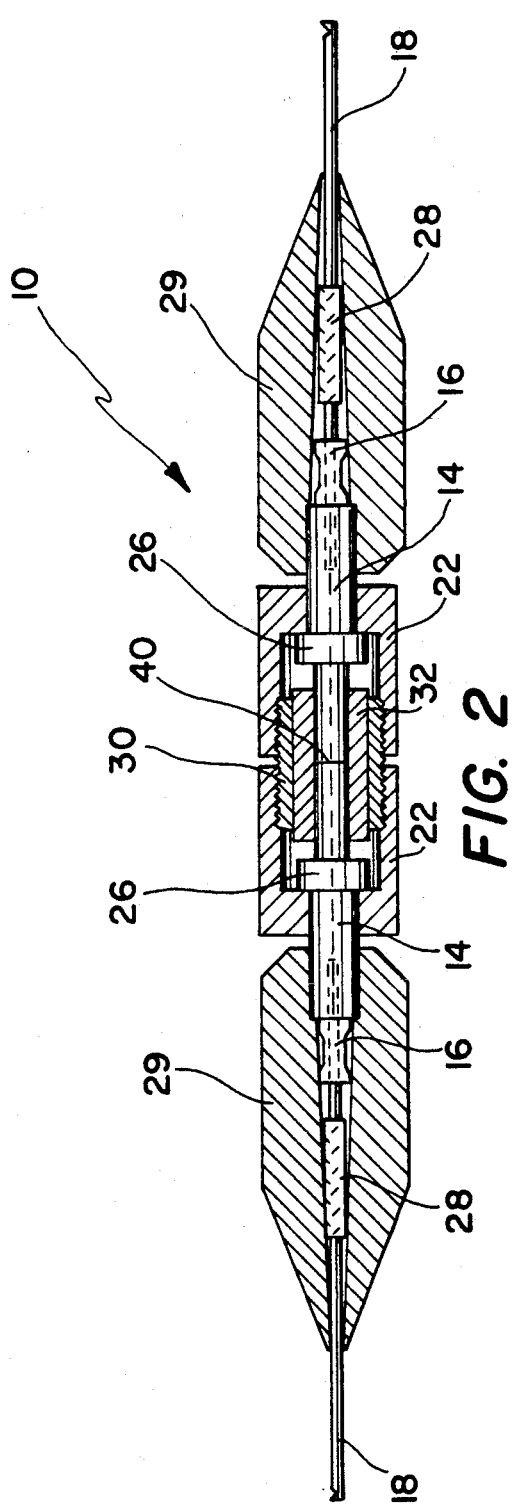
FIG. 2 is a cutaway side view of the device of FIG. 1.

Refer now to FIG. 1 where there is shown an exploded view of a first embodiment of the present invention and to FIG. 2 where there is shown the assembled arrangement of the components in the embodiment of FIG. 1. A coupling 10 includes a pair of mating symmetrical assemblies 12. Each assembly 12 is comprised of a ferruled component 14 that is a subassembly having a ceramic ferrule 15, a holding device 17, and a swaging component 16. The swaging component 16 is swaged onto a reinforced fiber 18. The fiber component of the reinforced fiber 18 extends through to the face 20 of the ceramic ferrule 15. A compression nut 22, having inner threads 23, captures the ferruled component 14 by abutting a face 24 on an integral shoulder 26. A swaging sleeve 28 is attached to the reinforced fiber 18 as an anchor. The cast or molded on strain relief 29 is affixed to interlock the strain relief swaging sleeve 28.

In addition to each assembly 12 there is a connecting sleeve 30 and a ceramic tube 32 used for connecting the assemblies 12 to each other.

The connecting sleeve 30 has outer threads 34 for mating with the inner threads 23 of each of the compression nuts 22. The ceramic tube 32 has a longitudinal split 38. The two ferruled components 14 have the faces 20 of ceramic ferrules 15 brought together inside the ceramic tube 32 and the spring action caused by the split 38 of tube 32 holds the ceramic ferrules 15 in precise alignment. By applying a specified torque to the compression nuts 22 a predetermined amount of compression is achieved at the fiber interface 40 of the faces 20 of the ceramic ferrules 15. This enables the optical fibers 18 to be held in position by a force greater then the anticipated tensile load placed on the coupling 10 when in use.

Decoupling of the optical fibers 18 and separation of components is obtained by unthreading compression nuts 22 from the connecting sleeve 30. The ferrules 15 can then be pulled from the tube 32 if still held within it.

Figure 3:
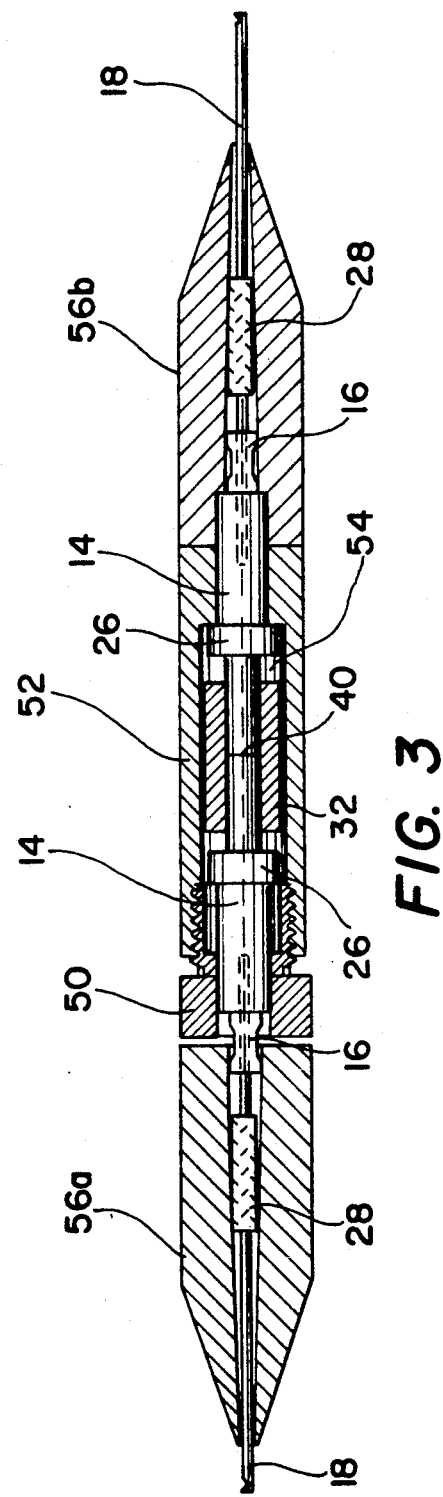
FIG. 3 is a cutaway side view of an alternate embodiment.

Refer now to FIG. 3 for a second embodiment of the invention. Identical components to those shown in FIGS. 1 and 2 carry the same numerical notation. The second embodiment has but a single compression nut 50 threaded into a body 52. A recess 54 in the body 52 contains the ceramic tube 32 and portions of the ferruled components 14. The desired compression at the fiber interface 40 is achieved by tightening the compression nut 50. Additional components shown are optical fibers 18, swaging sleeves 28, and strain reliefs 56a and 56b.

Decoupling of the optical fibers 18 and separation of components is obtained by unthreading compression nut 50 from the body 52. The ferruled components 14 can then be pulled from the tube 32 if still held within it.

There has therefore been described a connector that is of small size and can be used for single or multi-mode operation, has low back reflection, and the ability to pre-load the fiber interface. It provides stable signal capability, is immune to vibration and will also remain operationally constant under varying load and pressure conditions. Its design allows disassembly for cleaning, polishing or parts replacement.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A fiber optic connector for connecting optical fibers comprising:

a pair of ferruled components with each of said ferruled components having aperture means for passing one of said optical fibers throughout the entire length of said ferruled component and having holding means for holding one of said optical fibers, each of said ferruled components further having a ferrule with a face at an end of said ferrule, the faces providing an interface between said optical fibers;

a pair of compression nuts having threads, with each compression nut abutting and positioning one of said ferruled components;

a split ceramic tube having each of said ferrules inserted into opposite ends of said tube; and a connecting sleeve having threads at opposite ends of said sleeve with each end threaded to respective compression nuts for enabling each of said compression nuts to abut and position one of said ferruled components.

2. A fiber optic connector according to claim 1 further comprising:

said pair of ferruled components, said threads of said pair of compression nuts, said split ceramic tube and said connecting sleeve all being coaxial; and said ferrules of said pair of ferruled components being located innermost, said split ceramic tube being radially outward of said ferrules, said connecting sleeve being radially outward of said ceramic tube, and said threads of said compression nuts being located radially outward of said connecting sleeve.

3. A fiber optic connector according to claim 2 further comprising:

a pair of swaging sleeves with each swaging sleeve connected to at least one optical fiber at an axial location outside of each of said ferruled components; and a pair of strain reliefs with each strain relief connected to and located radially outward of each of said swaging sleeves.

4. A fiber optic connector according to claim 3 further comprising:

each of said compression nuts having inner threads; and said connecting sleeve having outer threads.

5. A fiber optic connector for connecting optical fibers comprising:

a pair of ferruled components with each of said ferruled components having aperture means for passing one of said optical fibers throughout the entire length of said ferruled component and having holding means for holding one of said optical fibers, each of said ferruled components further having a ferrule with a face at an end of said ferrule, the faces providing an interface between said optical fibers;

a compression nut having threads, said compression nut abutting and positioning one of said ferruled components;

a split ceramic tube having each of said ferrules inserted into opposite ends of said tube; and a body abutting and positioning the other of said ferruled components and further having threads that are threaded to said compression nut.

6. A fiber optic connector according to claim 5 further comprising:

said pair of ferruled components, said ceramic tube and a portion of said body all being coaxial; and said ferrules of said pair of ferruled components being located innermost, said split ceramic tube being radially outward of said ferrules, and said portion of said body extending radially outward of said ceramic tube.

7. A fiber optic connector according to claim 6 further comprising:

a pair of swaging sleeves with each swaging sleeve connected to at least one optical fiber at an axial location outside of each of said ferruled components; and a pair of strain reliefs with each strain relief connected to and located radially outward of each of said swaging sleeves.

8. A fiber optic connector according to claim 7 further comprising:

said compression nut having outer threads; and said body having inner threads.

* * * * *